(12) United States Patent
Plummer et al.

(10) Patent No.: US 12,219,308 B2
(45) Date of Patent: Feb. 4, 2025

(54) SOUND BAR MOUNT

(71) Applicant: Legrand AV Inc., Eden Prairie, MN (US)

(72) Inventors: Mark Plummer, Eden Prairie, MN (US); Adam Maves, Eden Prairie, MN (US)

(73) Assignee: Legrand AV Inc., Eden Prairie, MN (US)

( * ) Notice: Subject to any disclaimer, the term of this patent is extended or adjusted under 35 U.S.C. 154(b) by 148 days.

(21) Appl. No.: 17/912,413

(22) PCT Filed: Mar. 18, 2021

(86) PCT No.: PCT/US2021/022991
§ 371 (c)(1),
(2) Date: Sep. 16, 2022

(87) PCT Pub. No.: WO2021/188811
PCT Pub. Date: Sep. 23, 2021

(65) Prior Publication Data
US 2023/0209231 A1   Jun. 29, 2023

Related U.S. Application Data

(60) Provisional application No. 62/991,151, filed on Mar. 18, 2020.

(51) Int. Cl.
*H04R 1/02* (2006.01)
*F16M 11/04* (2006.01)
*F16M 11/18* (2006.01)

(52) U.S. Cl.
CPC .......... *H04R 1/026* (2013.01); *F16M 11/041* (2013.01); *F16M 11/045* (2013.01);
(Continued)

(58) Field of Classification Search
CPC .......................... H04R 1/026; H04R 2201/021
See application file for complete search history.

(56) References Cited

U.S. PATENT DOCUMENTS

| | | | |
|---|---|---|---|
| 2007/0152112 A1* | 7/2007 | Bober | F16M 11/18 248/125.2 |
| 2009/0050763 A1* | 2/2009 | Dittmer | F16M 11/24 248/298.1 |

(Continued)

FOREIGN PATENT DOCUMENTS

| | | | | |
|---|---|---|---|---|
| KR | 10-0784728 B1 | 12/2007 | | |
| KR | 784728 B1 | * 12/2007 | ......... | F16M 11/2057 |
| WO | WO-2021222631 A1 | * 11/2021 | ........... | A47B 81/064 |

OTHER PUBLICATIONS

International Search Report for PCT/US2021/022991 (PCT/ISA/210), dated Jul. 13, 2021 (5 pgs).
(Continued)

*Primary Examiner* — Sunita Joshi
(74) *Attorney, Agent, or Firm* — Bradley J. Thorson

(57) ABSTRACT

A mount for a soundbar includes a positioning column, and a positioning mechanism operably coupled to the positioning column. The positioning column is selectively shiftable relative to the positioning mechanism. A pair of mounting arms is coupled to the positioning mechanism, the mounting arms adapted to attach to a television and a sound bar interface is operably coupled to the positioning column.

17 Claims, 15 Drawing Sheets

(52) U.S. Cl.
CPC ......... *F16M 11/046* (2013.01); *F16M 11/048* (2013.01); *F16M 11/18* (2013.01); *F16M 2200/061* (2013.01); *H04R 2201/021* (2013.01)

(56) References Cited

U.S. PATENT DOCUMENTS

| | | | |
|---|---|---|---|
| 2011/0233350 A1* | 9/2011 | Burgess | F16M 11/2014 248/123.11 |
| 2012/0255919 A1* | 10/2012 | Jones | F16M 13/02 211/26 |
| 2014/0270910 A1 | 9/2014 | Sculler et al. | |
| 2016/0120303 A1 | 5/2016 | Constantino et al. | |

OTHER PUBLICATIONS

Written Opinion of the International Searching Authority for PCT/US2021/022991 (PCT/ISA/237), dated Jul. 13, 2021 (6 pgs).
Extended European Search Report for EP Patent Application No. 21770503.7, mailed Mar. 25, 2024 (14 pgs).

* cited by examiner

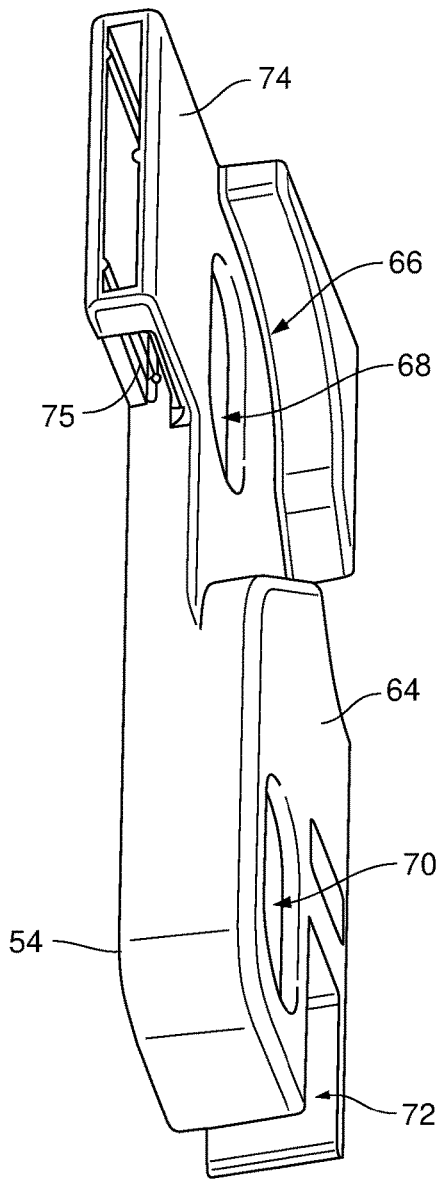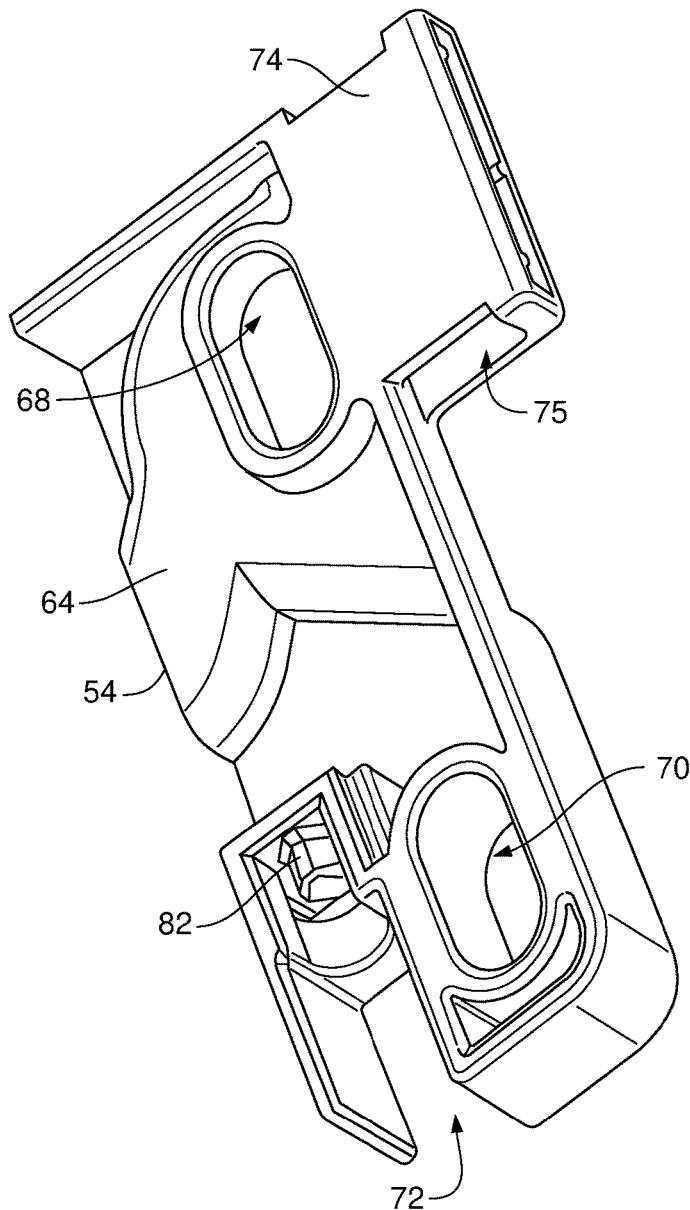
FIG. 7    FIG. 8

SOUND BAR MOUNT

RELATED APPLICATIONS

The present application claims priority to PCT Application No. PCT/US2021/022991, entitled SOUND BAR MOUNT, filed Mar. 18, 2021, and claims the benefit of U.S. Provisional Patent Application No. 62/991,151, entitled SOUND BAR MOUNT, filed Mar. 18, 2020, which are both hereby fully incorporated herein in their entirety by reference.

TECHNICAL FIELD

This application relates to mounts for electronic equipment, and more specifically to mounts for speakers and sound bars.

BACKGROUND

The use of sound bars has become increasingly popular in conjunction with televisions to provide sound quality superior to built-in speakers of the TV while still occupying minimal space. Typically, however, sound bars have been fixed to the wall or other structures with fixed mounts, limiting the versatility of the sound bar. For example, some sound bars now feature directional sound to enhance the listening experience of a user. If the sound bar is mounted to a fixed structure without adjustability, the advantage of directional sound is severely limited or lost.

Moreover, televisions are often mounted on a wall with a mount that enables the television to be oriented relative to the wall as desired—for example, closer to or further away from the wall, pivoted to face different parts of the room, or tilted to give an optimal viewing angle. If a fixed, wall mounted sound bar is used in conjunction with a television mounted in such a fashion, the sound produced by the sound bar may face in a different direction than the television screen. What is needed in the industry is a sound bar mount that can be positioned relative to a wall or other structure where the sound bar is to be mounted, or positioned relative to a television, while remaining proximate the television.

SUMMARY

The present invention addresses the needs of the industry by providing a mount that can be adjustably positioned relative to a television, wall, or other structure. In an embodiment, a mount for a sound bar includes a positioning column, and a positioning mechanism operably coupled to the positioning column. The positioning column is selectively shiftable relative to the positioning mechanism. A pair of mounting arms is coupled to the positioning mechanism, the mounting arms adapted to attach to a television and a sound bar interface is operably coupled to the positioning column.

In embodiments the positioning column defines a multiplicity of apertures and the positioning mechanism has a ratchet lever selectively engageable with the apertures. The positioning mechanism can have an actuator and a release handle, the actuator operably coupled with the release handle and the rachet lever to enable the rachet lever to be selectively disengaged from the apertures. The sound bar interface can include a scissors mechanism and a wire guide connector. The mount can further include a second actuator, the second actuator operably coupled with the release handle and a second rachet lever to enable both the first and second rachet levers to be selectively disengaged from the apertures.

In embodiments, a mount for a sound bar includes a wall interface, a pair of sound bar interface portions, and a pair of scissors mechanisms, each of the sound bar interface portions being operably coupled to the wall interface with a separate one of the scissors mechanisms.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 7 is another isometric view of the actuator of FIG. 5;

FIG. 8 is another isometric view of the actuator of FIG. 5 showing the spring locating recess;

Figure 1:
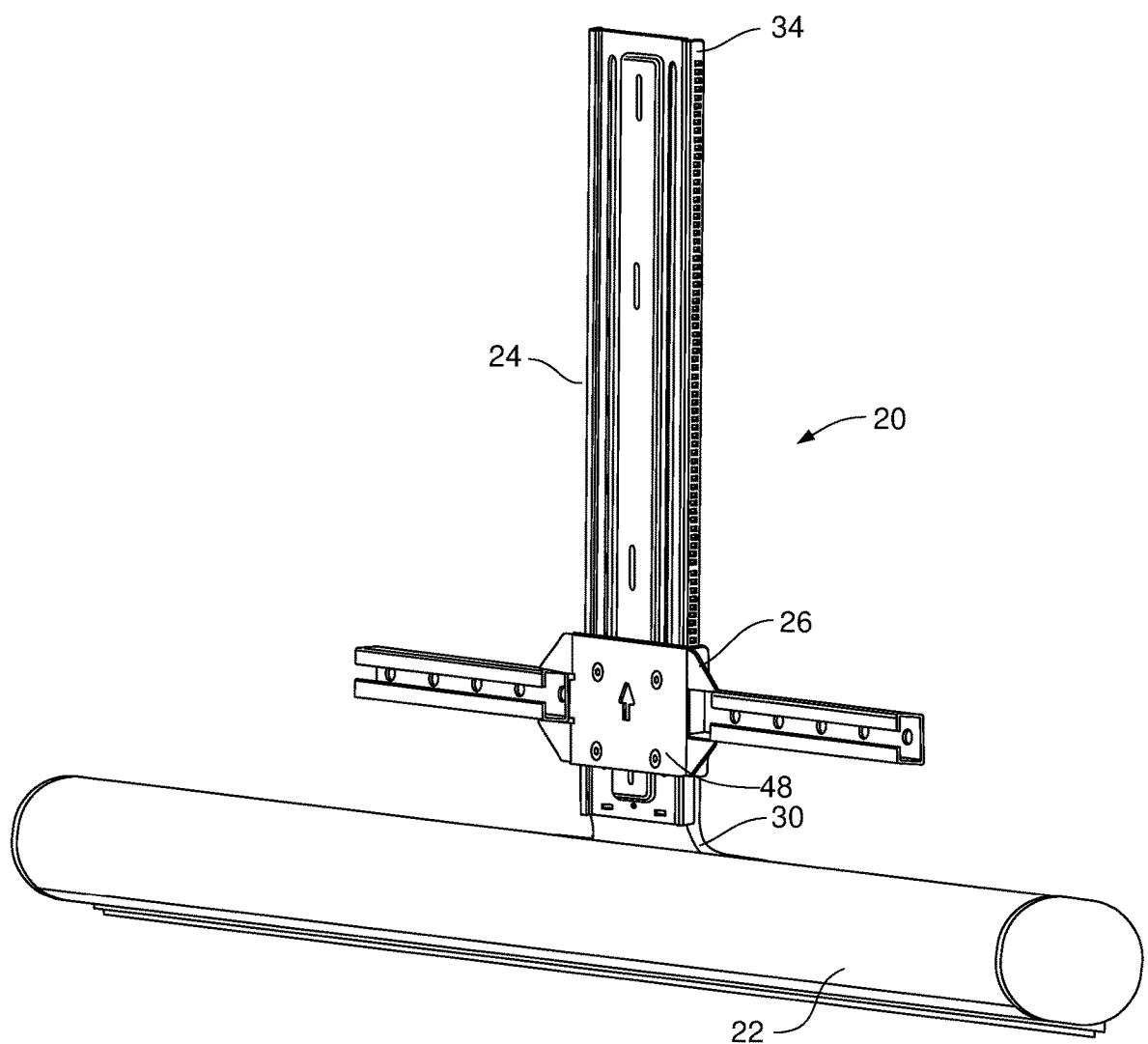
FIG. 1 is a front isometric view of a sound bar and display mount according to an embodiment if the invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

In FIGS. 1, 1*a*, 2, 2*a*, and 4-14 there is depicted a mount 20 for a sound bar 22 according to an embodiment of the invention. Mount 20 generally includes positioning column 24, positioning mechanism 26, television mounting arms 28, 30, and sound bar interface 32.

Figure 13:
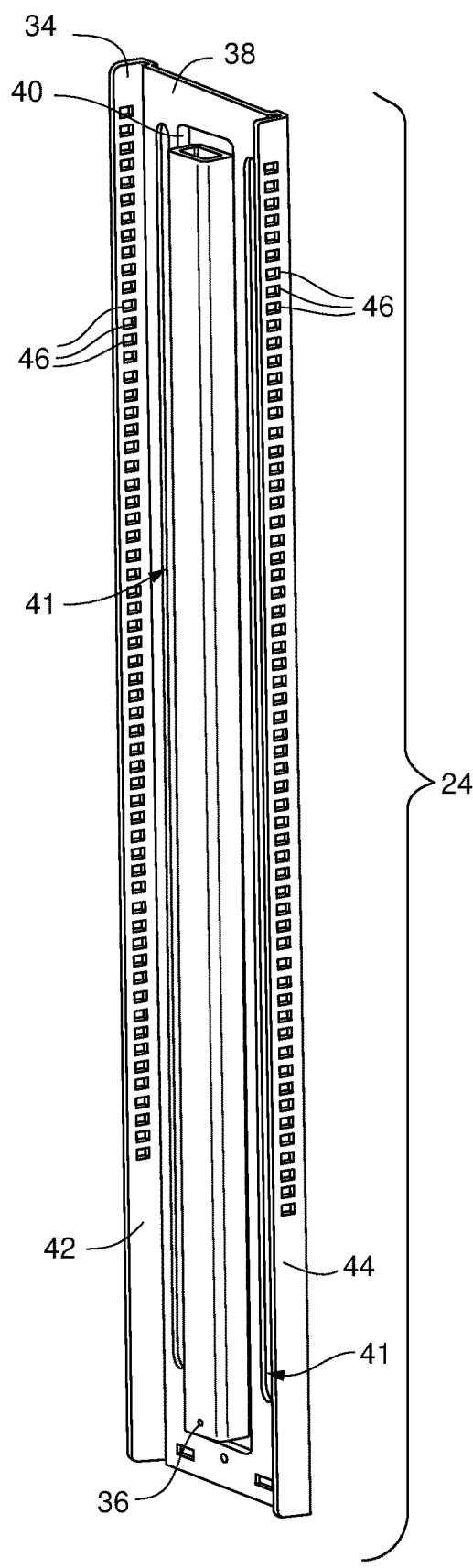
FIG. 13 is a rear isometric view of the positioning column of the mount of FIG. 1.
Figure 14:
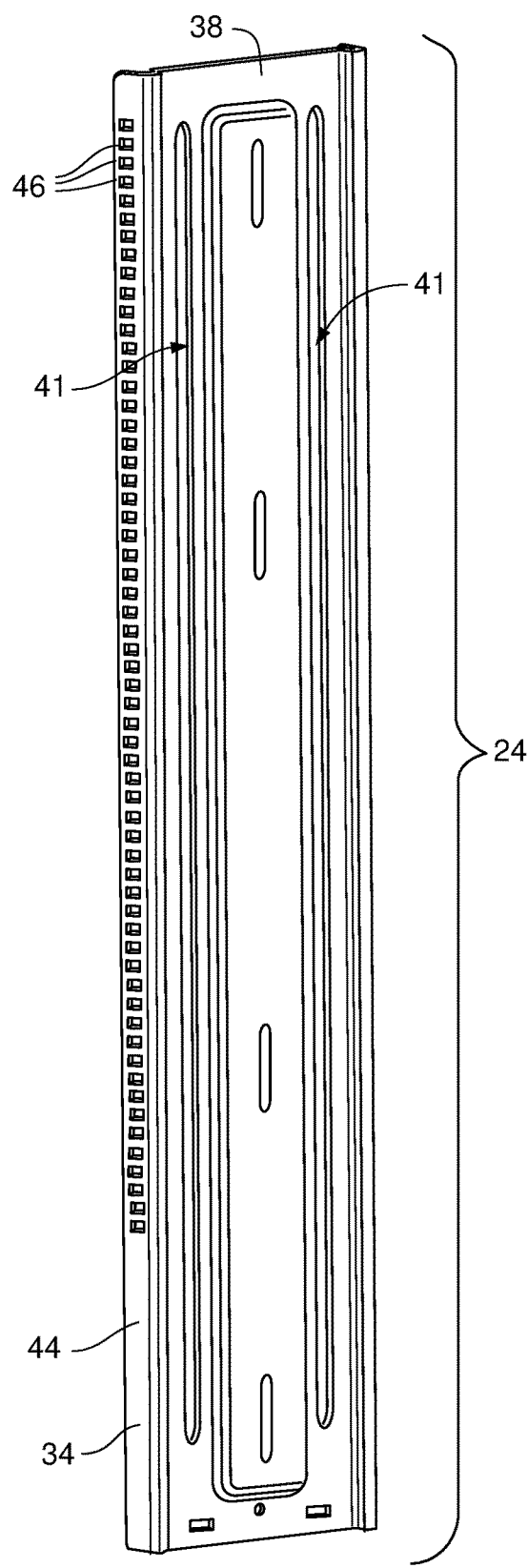
FIG. 14 is a front isometric view of the positioning column of the mount of FIG. 1.

As depicted in FIGS. 13 and 14, positioning column 24 generally includes track 34 and central tube 36. Track 34 has front wall 38 defining recess 40, slots 41 on each side of recess 40, and side walls 42, 44. Each of side walls 42, 44, defines a multiplicity of apertures 46. Central tube 36 is received in recess 40.

Positioning mechanism 26 generally includes front housing 48, rear housing 50, actuators 52, 54, rachet levers 58, biasing springs 60, and retainers 62. As depicted in FIGS. 5-8, each of actuators 52, 54, generally includes body 64 defining lever recess 66, upper slot 68, lower slot 70, spring recess 72, and handle engaging portion 74 which defines vertical slot 75. Rachet levers 58 pivot on upper guide pins 76, which extend through upper slots 68 and retainers 62 and attach to front housing 48 and rear housing 50. Lower guide pins 78 extend through lower slots 70 and retainers 62, and also attach to front housing 48 and rear housing 50. Biasing springs 60 are received in spring recesses 72, with upper end 80 received on bosses 82. Actuators 52,54, are vertically slidably received between central tube 36 and side walls 42,44, of track 34, guided by upper guide pins 76 and lower guide pins 78.

Figure 9:
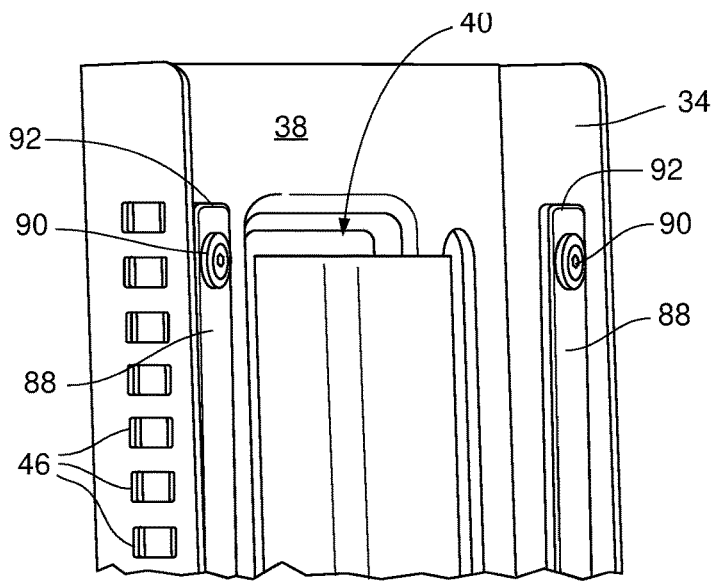
FIG. 9 is a rear isometric view of the top end of the mount of FIG. 1.

Release handle 84 has gripping portion 86 and flexible straps 88. As depicted in FIG. 9, each of flexible straps 88 has an engaging rivet 90 at the upper end 92 thereof. Flexible straps 88 extend through vertical slots 75 of actuators 52, 54.

Figure 1A:
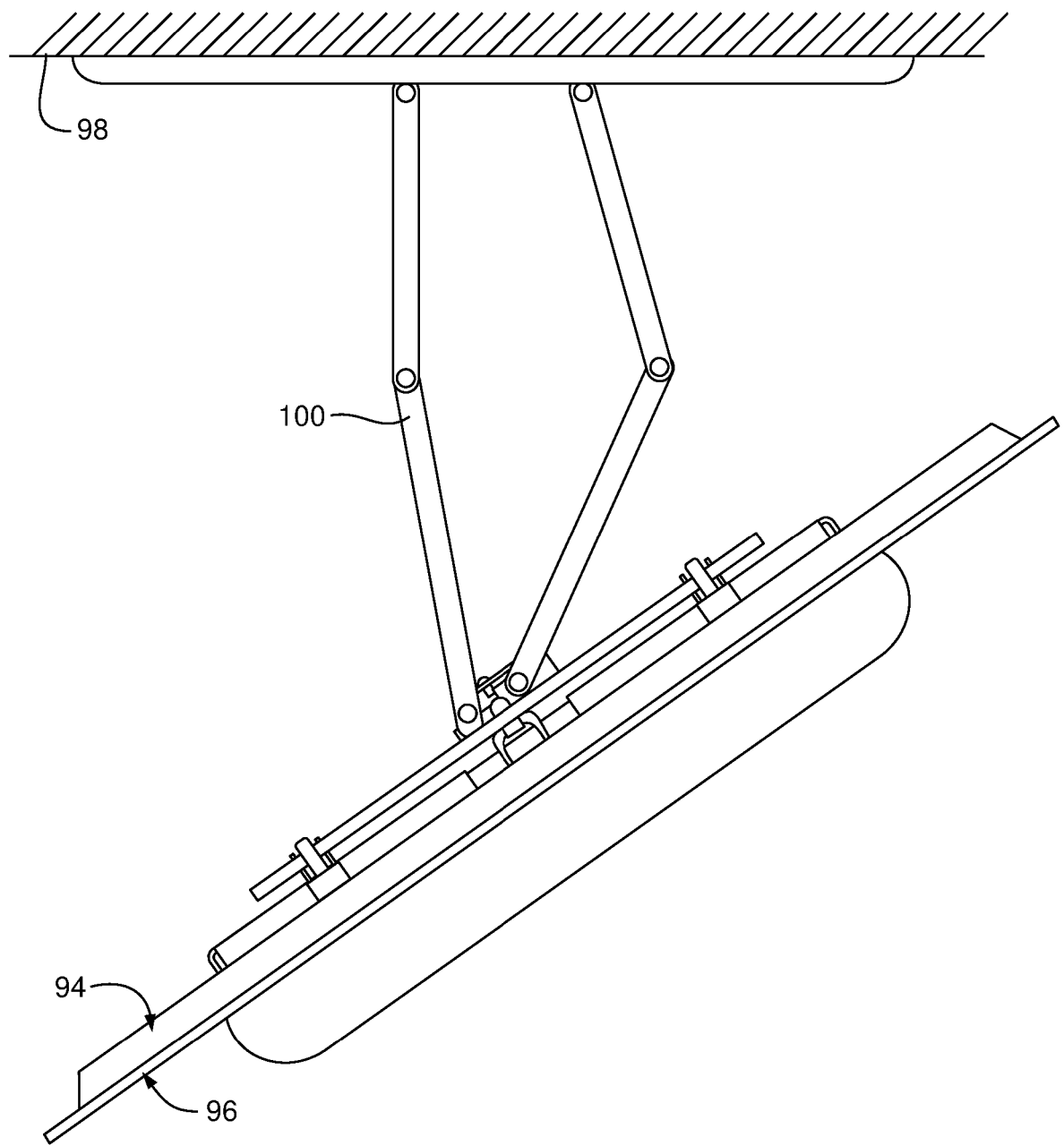
FIG. 1a is a top view of the sound bar and display mount of FIG. 1 with an attached television mounted to a wall with a full-motion display mount.

Television mounting arms 28, 30, are secured to front housing 48 and rear housing 50 of positioning mechanism 48 with fasteners (not depicted). Television mounting arms 28, 30, can be attached to the rear side 94 of a television 96 as depicted in FIG. 1*a*. As also depicted in FIG. 1*a*, television 96 can be mounted to a wall 98 with a mount 100. It will be appreciated that mount 100 can be any suitable mount enabling positioning of the television 96 with respect to the wall 98, such as, for a non-limiting example, the mount disclosed in U.S. Pat. No. 9,121,543, owned by the owners of the present invention, said patent being hereby fully incorporated herein by reference.

Figure 2:
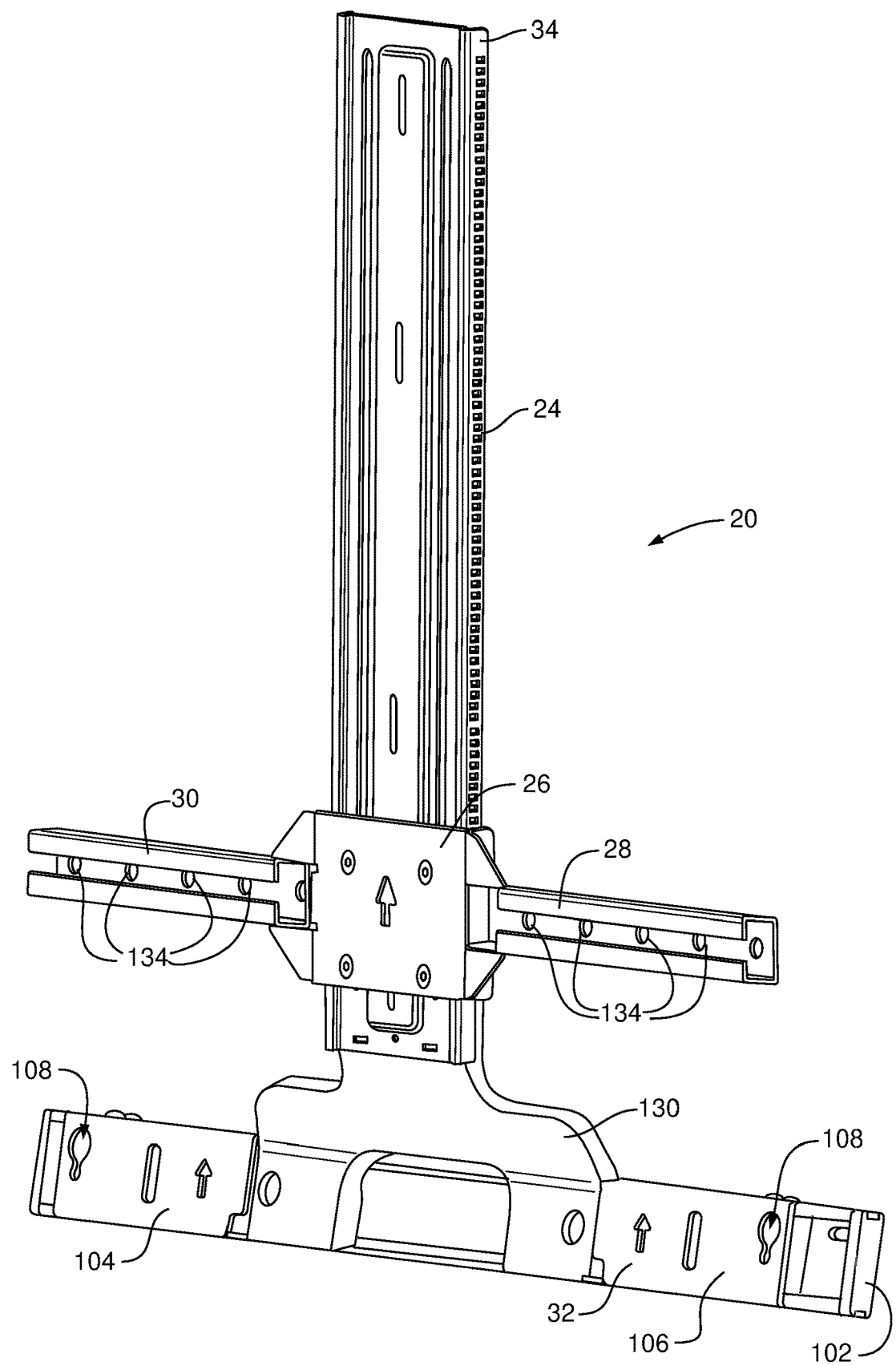
FIG. 2 is a front isometric view of the sound bar mount of FIG. 1.
Figure 2A:
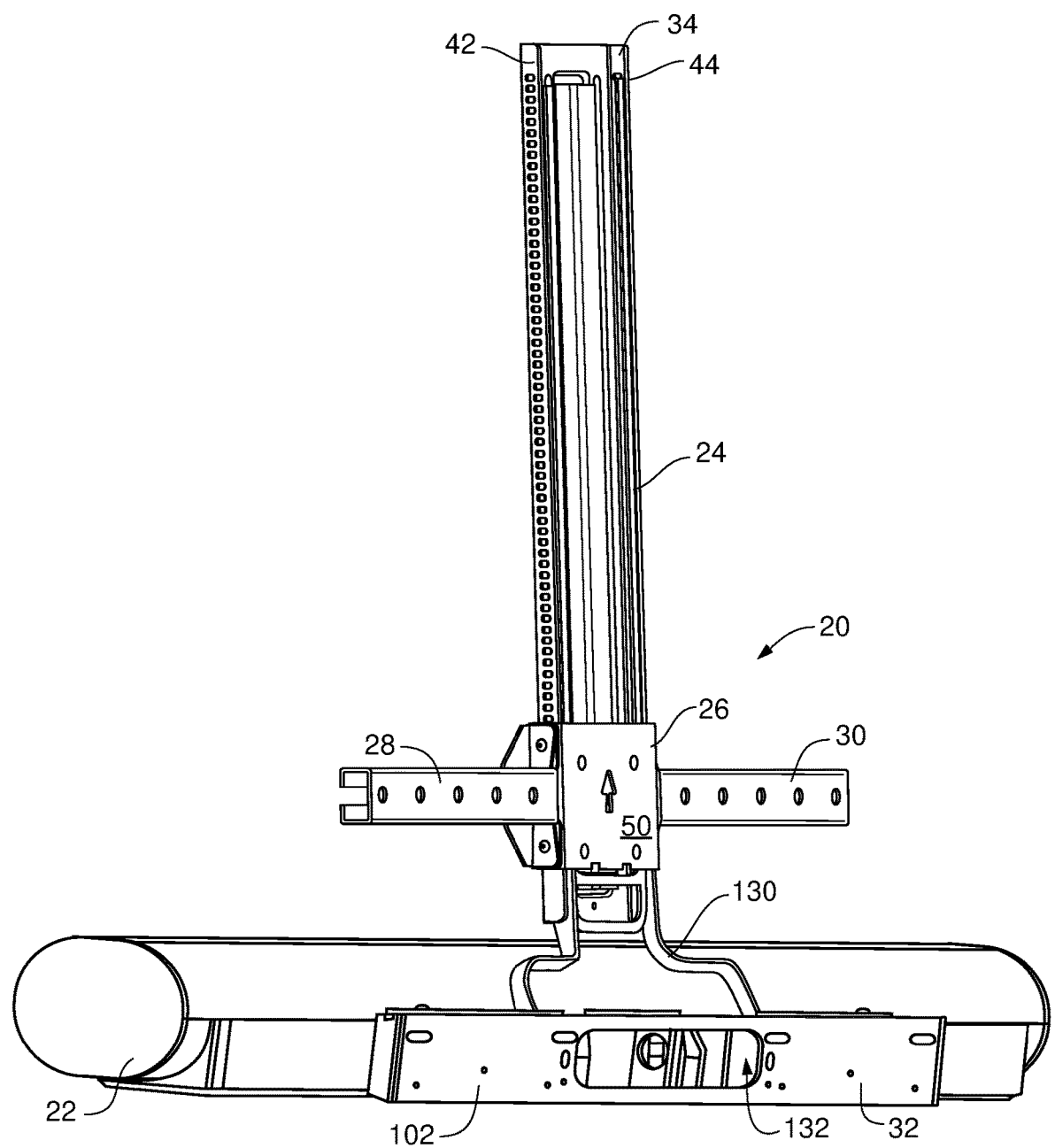
FIG. 2a is a rear isometric view of the sound bar mount and sound bar of FIG. 1.
Figure 11:
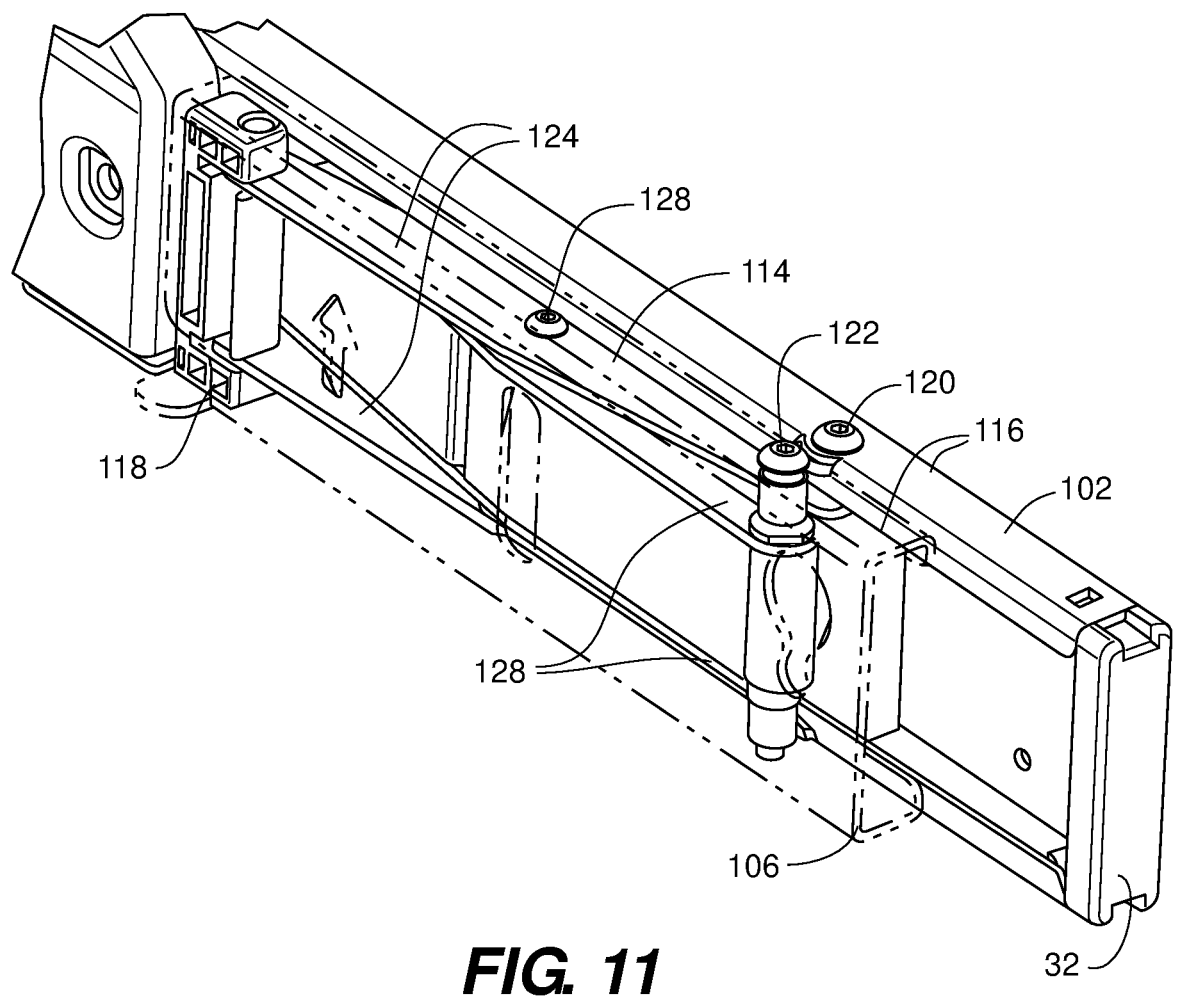
FIG. 11 is a front isometric view of the sound bar receiving portion of the mount of FIG. 1, with the sound bar receiving channel depicted in phantom for clarity.
Figure 12:
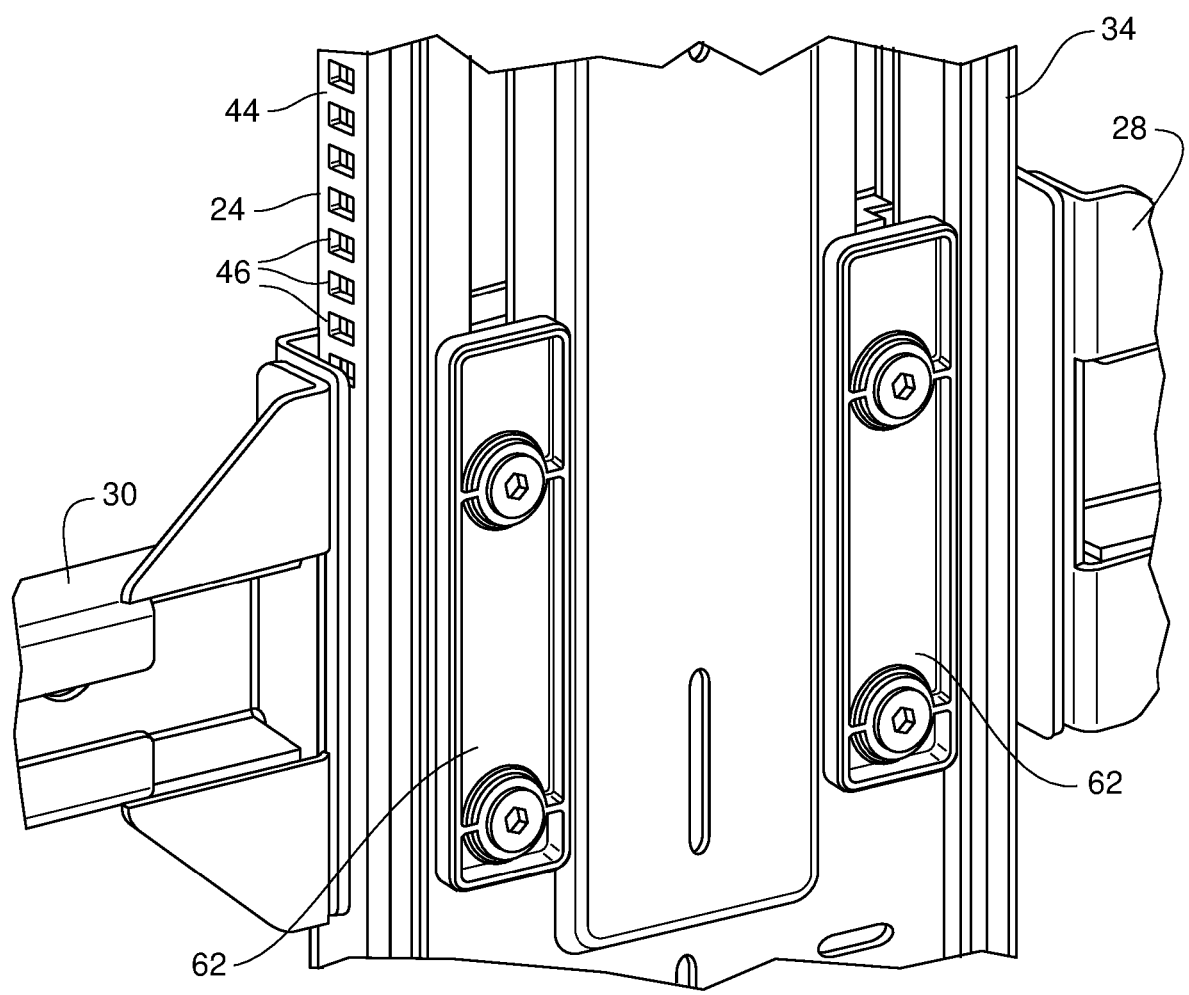
FIG. 12 is a partial front isometric view of the positioning mechanism of the sound bar mount of FIG. 1 with the front housing omitted for clarity.

As depicted in FIGS. 2, 2*a*, and 11, sound bar interface 32 generally includes rear channel 102, and sound bar interface channels 104, 106. Each of sound bar interface channels 104, 106, defines a keyhole slot 108, enabling sound bar 22 to be removably coupled to front faces 110, 112. As depicted in FIG. 11, each of sound bar interface channels 104, 106, is coupled to rear channel 102 with a scissors mechanism 114.

Each scissors mechanism 114 generally includes slide block 116, slide block 118, pivot pin 120, pivot pin 122, first arm pair 124, and second arm pair 126. Arm pairs 124, 126, are pivotally coupled with pivot pin 128. Slide blocks 116 are slidably received in the c-shaped channel formed by rear channel 102, and slide blocks 118 are received in the c-shaped channels formed by sound bar interface channels 104, 106. First arm pair 124 is pivotally coupled to slide block 118, and second arm pair 126 is pivotally coupled to slide block 116.

Sound bar interface 32 is attached to positioning column 24 with wire guide connector 130. It will be appreciated that audio and power wires (not depicted) for sound bar 22 can be concealed behind wire guide connector 130 and can be routed to sound bar 22 through wire opening 132 in rear channel 102.

In use, mount 20 can be attached to rear side 94 of television 96 with fasteners (not depicted) through apertures 134. Television 96 can then be mounted to wall 98 with mount 100, and sound bar 22 attached to mount 20 by engaging fasteners (not depicted) on sound bar 22 with keyhole slots 108.

Figure 4:
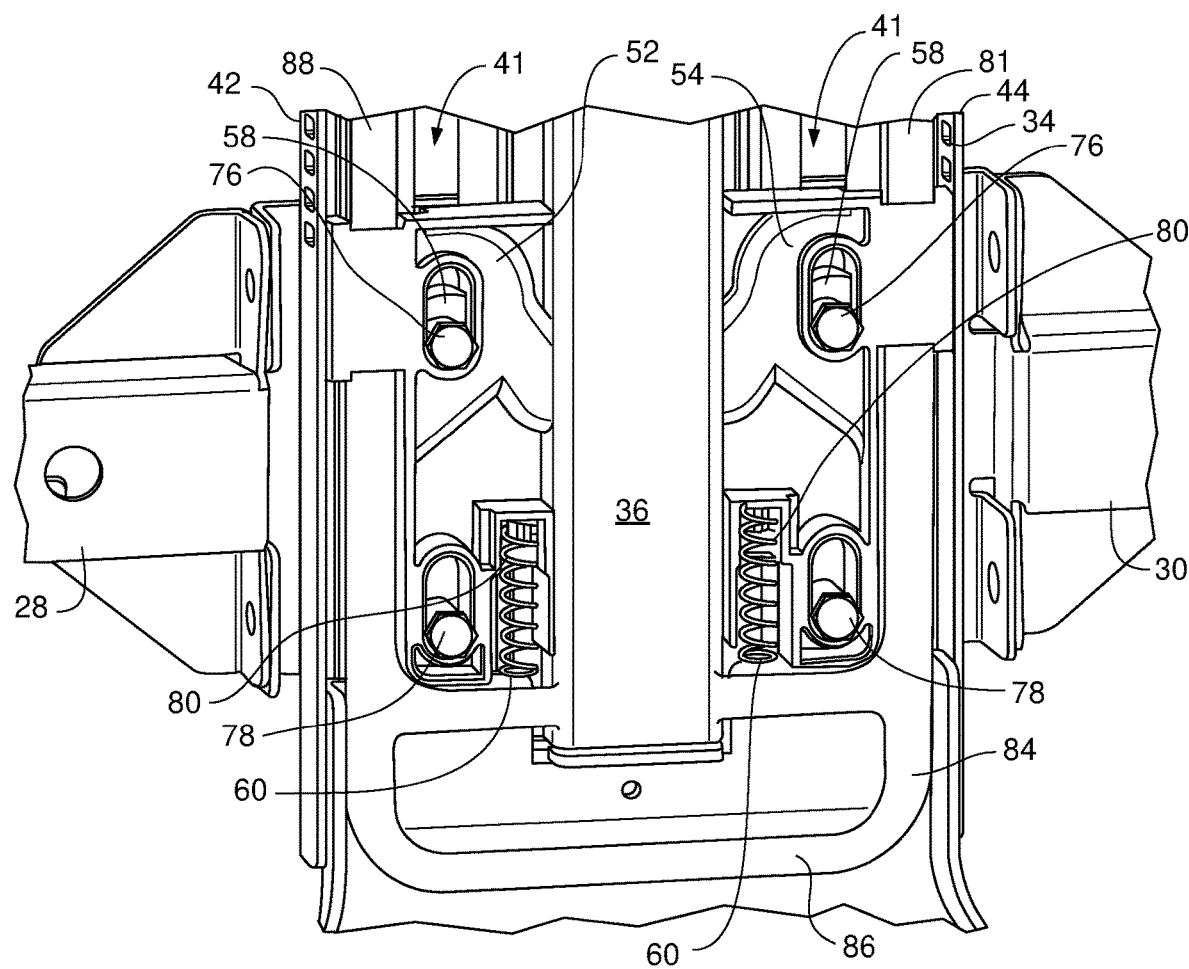
FIG. 4 is a partial rear isometric view of the positioning mechanism of the sound bar mount of FIG. 1 with the rear housing omitted for clarity.
Figure 4A:
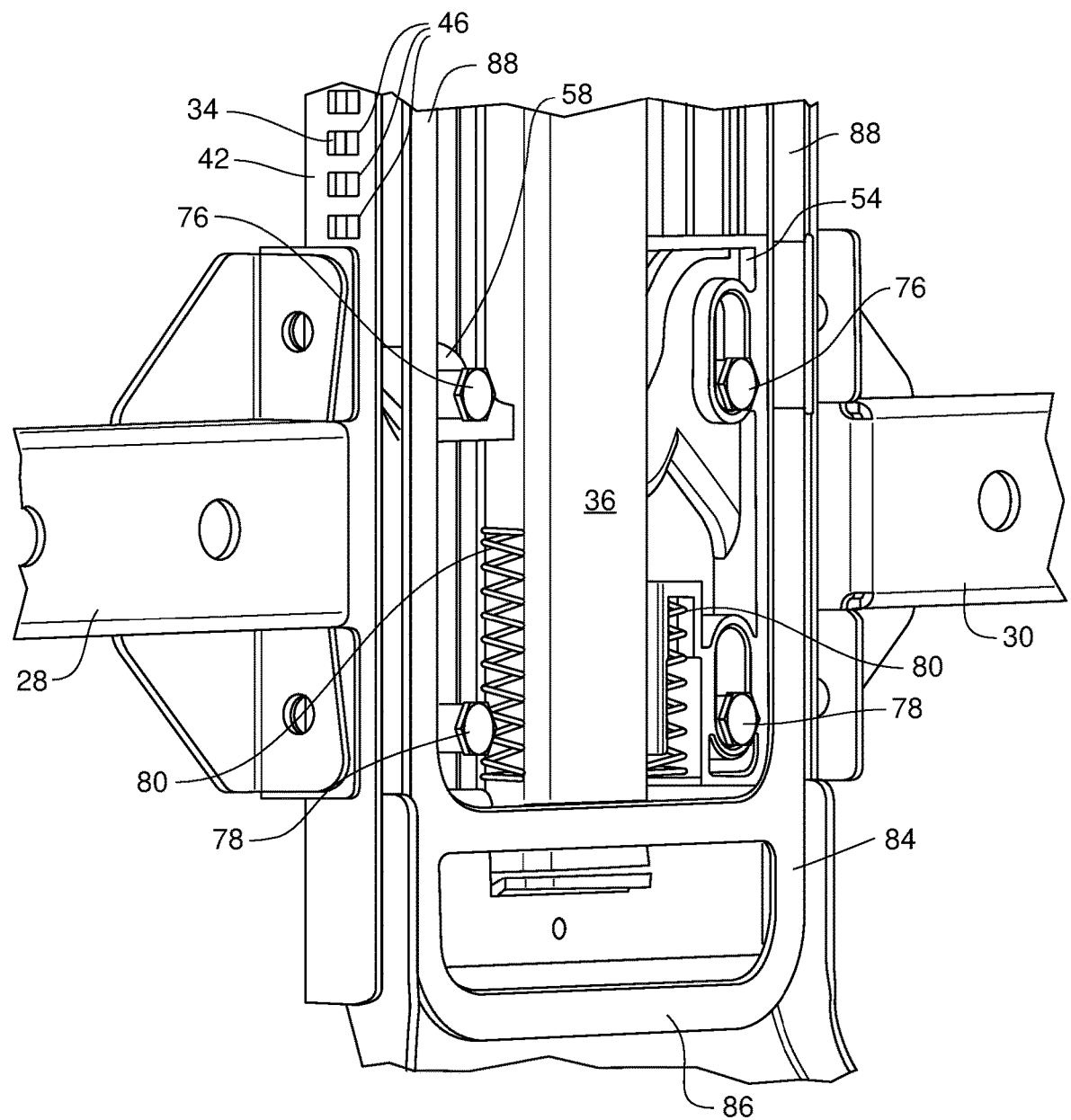
FIG. 4a is a partial rear isometric view of the positioning mechanism of the sound bar mount of FIG. 1 with the rear housing and one actuator omitted for clarity.
Figure 5:
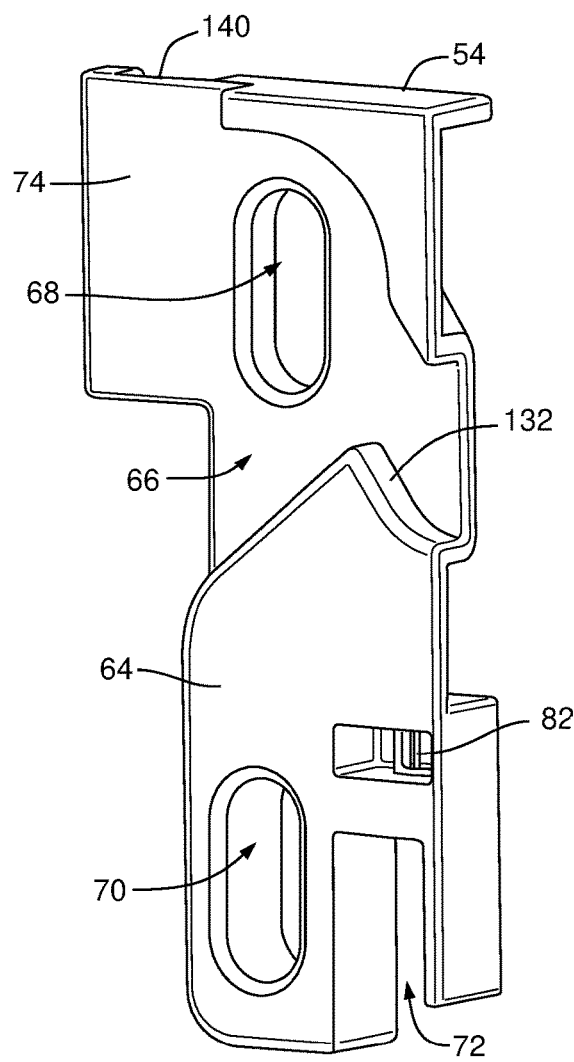
FIG. 5 is a rear isometric view of an actuator of the positioning mechanism of FIG. 4.
Figure 6:
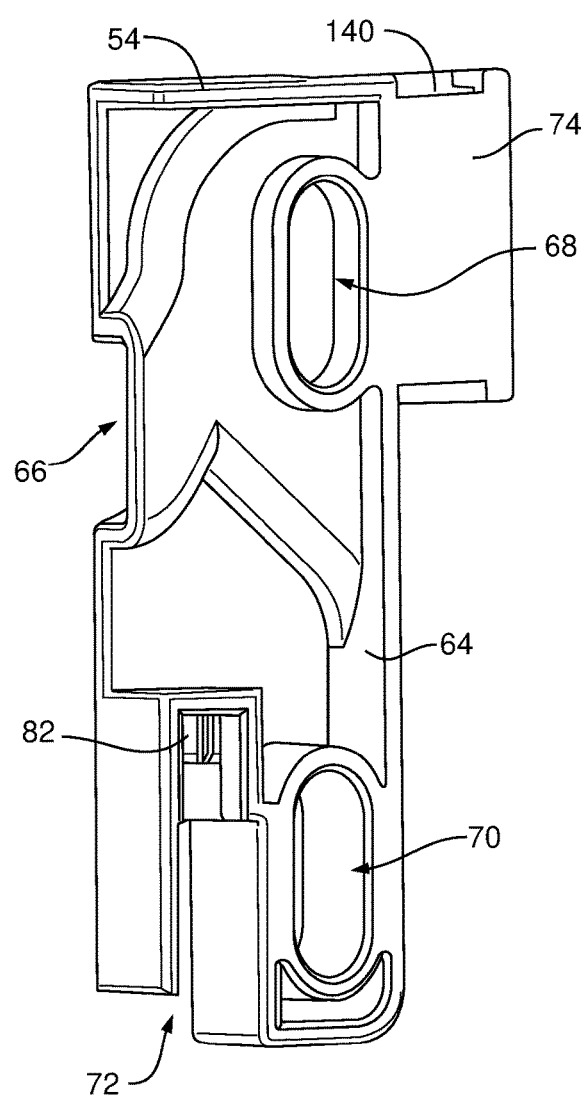
FIG. 6 is a front isometric view of the actuator of FIG. 5.

In an initial position, tips 136 of rachet levers 58 engage with apertures 46 of track 34, and rear edges 138 engage an interior surface 139 of the lever recess 66, thereby preventing rotation of rachet levers 58, and preventing downward movement of positioning mechanism 26 and sound bar 22 relative to positioning column 24. Release handle 84 is stowed within positioning column 24 as depicted in FIGS. 2*a* and 4.

Figure 10:
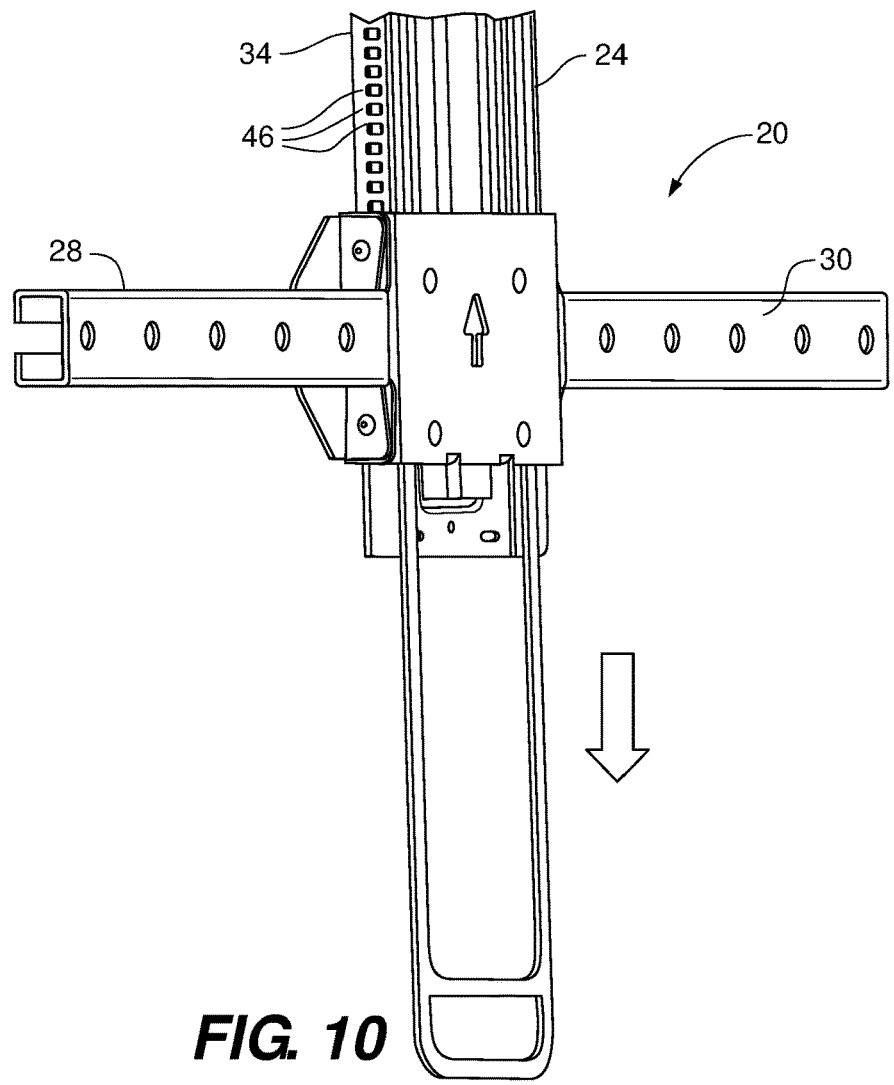
FIG. 10 is a partial rear isometric view of the mount of FIG. 1 showing operation of the release handle.

Sound bar 22 can be positioned downward relative to television 96 by deploying release handle 84, pulling it downward as depicted in FIG. 10. Engaging rivets 90 eventually engage top edge 140 of actuators 52, 54. As release handle 84 is pulled further downward, actuators 52, 54, slide downward on upper guide pins 76 and lower guide pins 78 against the bias of biasing springs 60. Rear edges 138 of ratchet levers 58 bear against interior surface 142, causing ratchet levers 58 to rotate, and tips 136 to disengage from apertures 46. Once the desired downward position is reached for sound bar 22, downward force on release handle 84 can be released, enabling actuators 52, 54, to return upward, urged by biasing springs 60, causing tips 136 of rachet levers 58 to reengage with apertures 46 and holding sound bar 22 in the desired position. Sound bar 22 can be positioned upward toward television 96 at any time without using release handle 84, merely by pushing upwardly on sound bar 22. Tips 136 will ratchet along apertures 46 and will reengage to prevent sound bar 22 from moving downwardly. Release handle 84 can be restowed out-of-sight at any time by pushing it upwardly within positioning column 24.

Sound bar 22 can be moved outwardly and angled horizontally relative to television 96 by pulling on the sound bar 22. Slide blocks 116, 118, slide in their respective channels of rear channel 102 and sound bar interface channels 104, 106. Arm pairs 124, 126, operate in a scissors fashion to enable each of interface channels 104, 106, to move independently of the other. Thus, sound bar 22 can be moved outward while maintaining general alignment with the front plane of the television 96, or the left or right end can be advanced outwardly more or less than the opposite end. At any time, either end of the sound bar 22 can be pushed inwardly toward television 96, or pulled outwardly, to achieve a different angle relative to television 96, or both at the same time to restore the original alignment.

Figure 3:
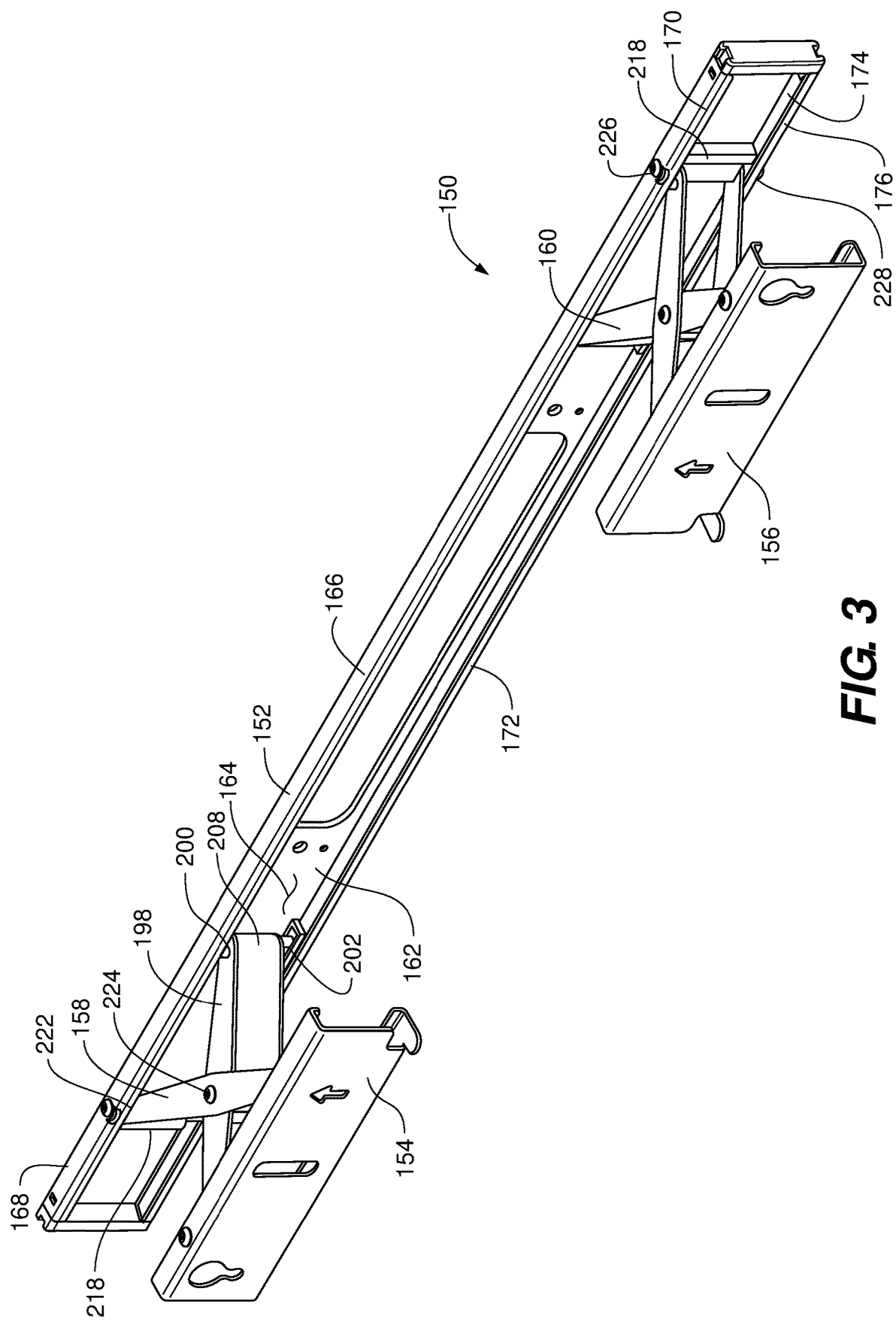
FIG. 3 is a front isometric view of a sound bar mount according to another embodiment of the invention.
Figure 3A:
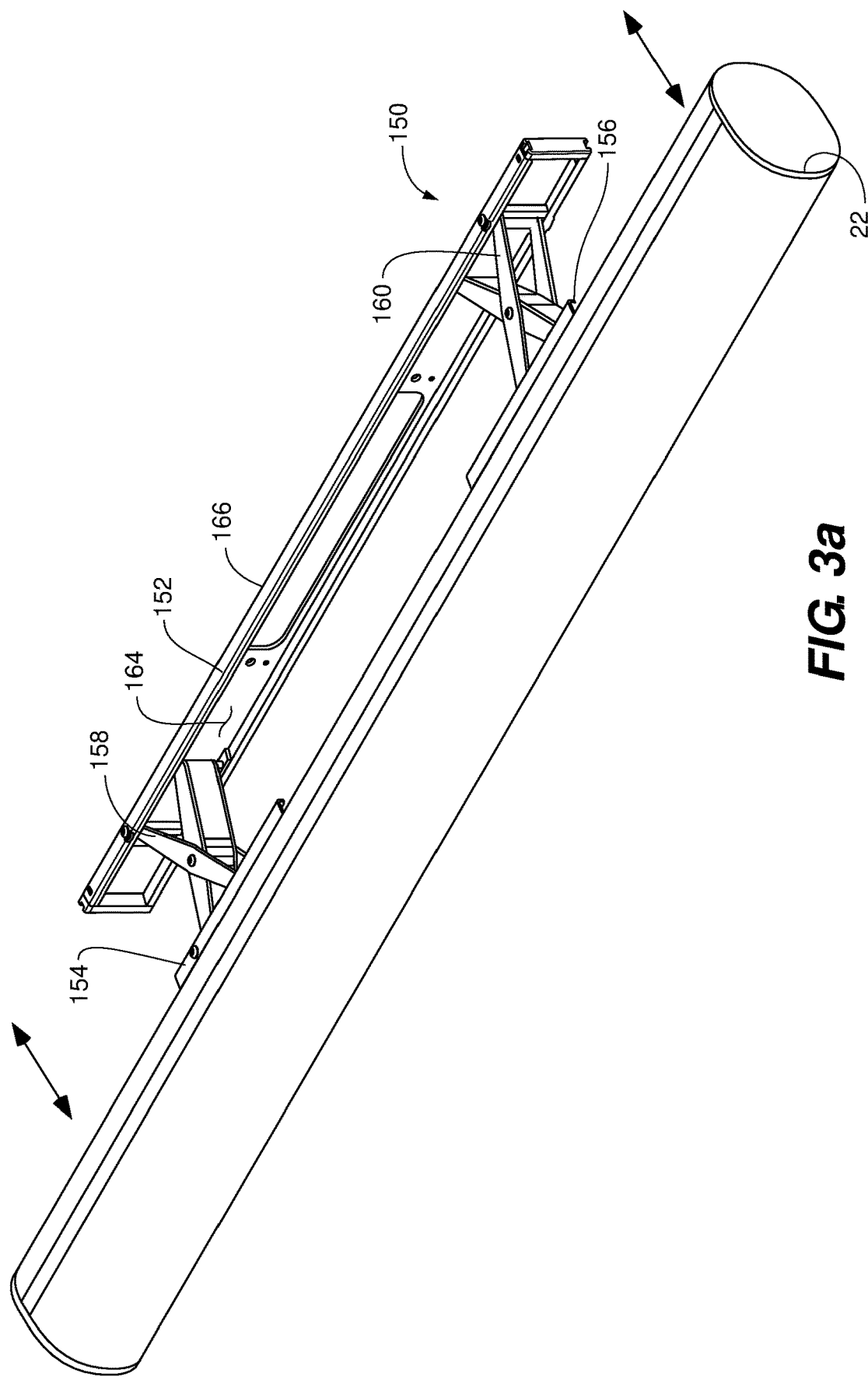
FIG. 3a is a front isometric view of the sound bar mount of FIG. 3 with an attached sound bar.
Figure 15:
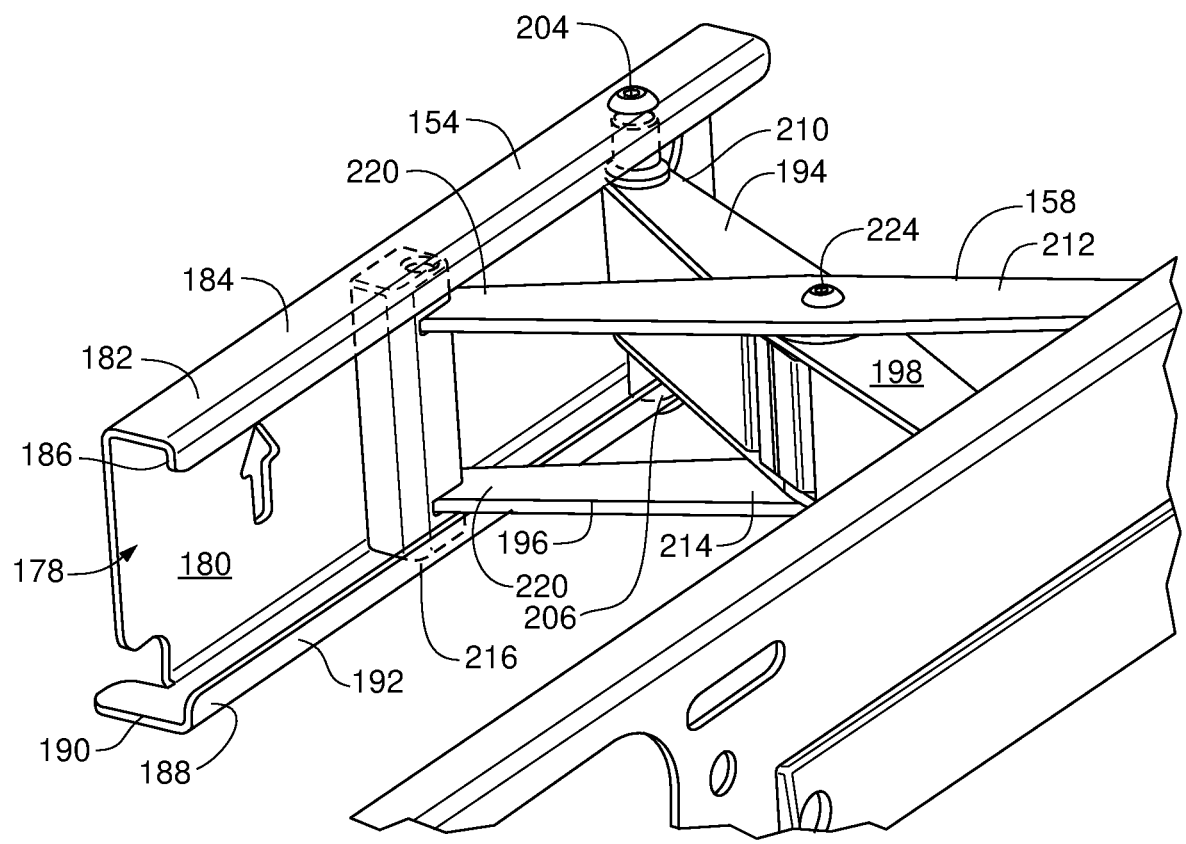
FIG. 15 is a partial rear isometric view of the mount of FIG. 3 with the sound bar receiving channel depicted in phantom for clarity.

In a second embodiment depicted in FIGS. 3, 3*a*, and 15, sound bar mount 150 generally includes wall interface 152, sound bar interface portions 154, 156, and scissors mechanisms 158, 160. Wall interface 152 forms a generally c-shaped channel 162 having back wall 164, upper flange 166, which includes top wall 168 and front wall 170, and lower flange 172, which includes bottom wall 174 and front wall 176. Sound bar interface portions 154, 156, each form a generally c-shaped channel 178 having front wall 180, upper flange 182, which includes top wall 184 and back wall 186, and lower flange 188, which includes bottom wall 190 and back wall 192.

Scissors mechanisms 158, 160, each generally include first arm assembly 194, and second arm assembly 196. First arm assembly 194 generally includes arm body 198, slide blocks 200, 202, and pivots 204, 206. Slide blocks 200, 202, are pivotally attached to arm body 198 at distal end 208, and pivots 204, 206, are pivotally attached to arm body 198 at proximal end 210. Second arm assembly 196 generally includes upper plate 212 and lower plate 214, slide block 216, and pivot block 218. Slide block 216 is pivotally attached to upper plate 212 and lower plate 214 at proximal ends 220, and pivot block 218, is pivotally attached to upper plate 212 and lower plate 214 at distal ends 222. First arm assembly 194 and second arm assembly 196 are pivotally coupled together with central pivot pin 224.

Slide block 200 is slidably received between front wall 170 of upper flange 166 and back wall 164 of wall interface 152. Slide block 202 is slidably received between front wall 176 of lower flange 172 and back wall 164 of wall interface 152. Pivots 204, 206, are pivotally attached to top wall 184 and bottom wall 190 of sound bar interfaces 154, 156. Slide blocks 216 are slidably received in flanges 182, 188, of sound bar interfaces 154, 156, and pivot block 218 is attached to wall interface 152 with fasteners 226, 228.

Sound bar 22 is detachably coupled to sound bar interfaces 154, 156, and wall interface 152 is attached to the wall of a structure or other substrate structure (not depicted). In use, as depicted in FIG. 3a, sound bar 22 and sound bar interfaces 154, 156, can be pulled away or pushed toward wall interface 152, thereby moving the sound bar away from or closer to the wall. It will be appreciated that scissors mechanisms 158, 160, operate independently so that the right and left ends of sound bar 22 can be different distances from the wall to which wall interface 152 is attached. Central pivot pins 224 can be loosened or tightened to remove or add tension in the assembly as desired.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A mount for a sound bar comprising:
   a positioning column;
   a positioning mechanism operably coupled to the positioning column, the positioning column being selectively shiftable relative to the positioning mechanism, wherein the positioning column defines a multiplicity of apertures and the positioning mechanism has a ratchet lever selectively engageable with the apertures;
   a pair of mounting arms coupled to the positioning mechanism, the mounting arms adapted to attach to a television; and
   a sound bar interface operably coupled to the positioning column.

2. The mount of claim 1, wherein the positioning mechanism has an actuator and a release handle, the actuator operably coupled with the release handle and the rachet lever to enable the rachet lever to be selectively disengaged from the apertures.

3. A mount for a sound bar comprising:
   a positioning column;
   a positioning mechanism operably coupled to the positioning column, the positioning column being selectively shiftable relative to the positioning mechanism;
   a pair of mounting arms coupled to the position mechanism, the mounting arms adapted to attach to a television; and
   a sound bar interface operably coupled to the positioning column, wherein the sound bar interface includes a scissors mechanism.

4. A mount for a sound bar comprising:
   a positioning column;
   a positioning mechanism operably coupled to the positioning column, the positioning column being selectively shiftable relative to the positioning mechanism;
   a pair of mounting arms coupled to the positioning mechanism, the mounting arms adapted to attach to a television; and
   a sound bar interface operably coupled to the positioning column, wherein the mount further comprises a wire guide connector.

5. The mount of claim 2, wherein the mount further comprises a second actuator, the second actuator operably coupled with the release handle and a second rachet lever to enable both the first and second rachet levers to be selectively disengaged from the apertures.

6. A mount for a sound bar comprising:
   a wall interface defining a c-shaped channel;
   a pair of sound bar interface portions;

a pair of scissors mechanisms, each of the sound bar interface portions being operably coupled to the wall interface with a separate one of the scissors mechanisms, wherein each one of the pair of scissors mechanisms includes a first arm assembly and a second arm assembly, the first arm assembly having a first end and an opposing second end, the second arm assembly having a first end and an opposing second end, the first arm assembly and the second arm assembly being pivotally coupled together by a pivot pin; and a first pair of slide blocks, each of the slide blocks being received and slidable in the c-shaped channel of the wall interface, the first end of each first arm assembly being pivotally coupled to the wall interface, the first end of each second arm assembly being operably coupled to a separate one of the first pair of slide blocks.

7. The mount of claim 6, wherein each one of the pair of sound bar interface portions defines a c-shaped channel and the mount further comprises a second pair of slide blocks, each one of the pair of slide blocks being received and slidable in the c-shaped channel of a separate one of the pair of sound interface portions, the second end of each one of the first arm assemblies being operably coupled to a separate one of the second pair of slide blocks, the second end of each one of the pair of second arm assemblies being pivotally coupled to a separate one of the sound interface portions.

8. The mount of claim 6, wherein each of the sound bar interface portions defines a keyhole slot adapted to receive a fastener to attach a sound bar to the sound bar interface portions.

9. A mount for a sound bar comprising:
a positioning column;
a positioning mechanism operably coupled to the positioning column, the positioning column being selectively shiftable relative to the positioning mechanism;
a pair of mounting arms coupled to the positioning mechanism, the mounting arms adapted to attach to a television; and
a sound bar interface operably coupled to the positioning column, the sound bar interface comprising:
a rear channel;
a plurality of sound bar interface channels adapted to receive a sound bar; and
a plurality of scissors mechanisms, each of the plurality of scissors mechanisms operably coupling a separate one of the sound bar interface channels to the rear channel.

10. The mount of claim 9, wherein the positioning column defines a multiplicity of apertures, and the positioning mechanism has a ratchet lever selectively engageable with the apertures.

11. The mount of claim 9, wherein the positioning mechanism has an actuator and a release handle, the actuator operably coupled with the release handle and the rachet lever to enable the rachet lever to be selectively disengaged from the apertures.

12. The mount of claim 11, wherein the mount further comprises a second actuator, the second actuator operably coupled with the release handle and a second rachet lever to enable both the first and second rachet levers to be selectively disengaged from the apertures.

13. The mount of claim 9, wherein the mount further comprises a wire guide connector.

14. The mount of claim 9, wherein each one of the plurality of scissors mechanisms includes a first arm assembly and a second arm assembly, the first arm assembly having a first end and an opposing second end, the second arm assembly having a first end and an opposing second end, the first arm assembly and the second arm assembly being pivotally coupled together by a pivot pin.

15. The mount of claim 14, wherein the rear channel is c-shaped and the mount further comprises a first pair of slide blocks, each of the slide blocks being received and slidable in the rear channel, the first end of each first arm assembly being pivotally coupled to the rear channel, the first end of each second arm assembly being operably coupled to a separate one of the first pair of slide blocks.

16. The mount of claim 15, wherein each one of the plurality of sound bar interface channels is c-shaped and the mount further comprises a second pair of slide blocks, each one of the pair of slide blocks being received and slidable in a separate one of the sound bar interface channels, the second end of each one of the first arm assemblies being operably coupled to a separate one of the second pair of slide blocks, the second end of each one of the pair of second arm assemblies being pivotally coupled to a separate one of the sound bar interface channels.

17. The mount of claim 9, wherein each of the sound bar interface channels defines a keyhole slot adapted to receive a fastener to attach a sound bar to the sound bar interface channels.

* * * * *